United States Patent [19]

Riedmaier et al.

[11] Patent Number: 4,940,041
[45] Date of Patent: Jul. 10, 1990

[54] HEATER HAVING A CASING WITH AN INTEGRALLY CAST MOUNTING SPACE FOR CONTROL COMPONENTS

[75] Inventors: Josef Riedmaier, Pentenried; Friedrich Widemann; Bernhard Schmatelka, both of Munich, all of Fed. Rep. of Germany

[73] Assignee: Webasto AG Fahrzeugtechnik, Gauting, Fed. Rep. of Germany

[21] Appl. No.: 318,543

[22] Filed: Mar. 3, 1989

[30] Foreign Application Priority Data

Jul. 3, 1988 [DE] Fed. Rep. of Germany ....... 3807397

[51] Int. Cl.$^5$ ............................................. F24H 3/02
[52] U.S. Cl. .............................. 126/110 R; 126/110 B; 165/80.2; 237/12.3 C; 237/12.3 R
[58] Field of Search ............ 126/110 R, 110 B, 110 C; 237/12.3 R, 12.3 A, 12.3 C, 12.4, 30; 431/352, 263, 353; 165/43, 80.2

[56] References Cited

U.S. PATENT DOCUMENTS

| | | | |
|---|---|---|---|
| 3,940,665 | 2/1976 | Seki | 165/80.3 X |
| 3,989,029 | 11/1976 | Friedl et al. | |
| 3,989,030 | 11/1976 | Friedl | |
| 4,796,661 | 1/1989 | Hishinuma et al. | 165/80.3 X |
| 4,840,222 | 6/1989 | Lakin et al. | 165/80.3 X |

FOREIGN PATENT DOCUMENTS 2453202 6/1975 Fed. Rep. of Germany.

Primary Examiner—Larry Jones
Attorney, Agent, or Firm—Sixbey, Friedman, Leedom & Ferguson

[57] ABSTRACT

A heater, in particular a vehicle auxiliary heater, of the type which operates with a liquid heat exchange medium and which is tied, for example, into the coolant circuit of a motor vehicle. In this heater, a mounting space for a control device is formed on a jacket-like outer casing, preferably a formation cast integrally as part of the outer casing. In this mounting space, circuit boards and printed circuit cards of the control device and sensor elements are mounted. Heat produced by semiconductor power components of the control device is removed to the surroundings by wall surfaces, in particular side walls, of the mounting space to which they are mounted. An electric connection device is provided that connects the inputs and outputs of the control device to the respective operational parts to be controlled and/or to the vehicle. This electric connection device includes a plug-like base, which preferably is formed of plastic, in which suitable electric conductor parts and contact parts, by which the control device is connected to operational parts to be controlled, are inserted. The control device and/or the electric connection device are designed so that parts projecting on the heater are avoided and a compact design of a heater is achieved.

24 Claims, 2 Drawing Sheets

HEATER HAVING A CASING WITH AN INTEGRALLY CAST MOUNTING SPACE FOR CONTROL COMPONENTS

BACKGROUND OF THE INVENTION

The invention relates to a heater, in particular a vehicle auxiliary heater, which operates with a liquid heat exchange medium that flows through a space between a heat exchanger and a jacket-like outer casing, and having a control device with inputs and outputs for the essential operational parts, such as a combustion air fan, ignition device, flame monitor, circulating device for the heat exchange medium, solenoid valve in the fuel feed device or the like.

Heaters or vehicle heaters, which operate with a gaseous heat exchange medium, such as air, are known for example from U.S. Pat. No. 3,989,029, U.S. Pat. No. 3,989,030, and from German Pat. No. 24 53 202. In these heaters, a space projecting above the outer profile of a jacket-like outer casing of the heater is provided that can be closed by a cover. In this space, which is connected to the induction side of the combustion air fan, there is mounted, among other things, an ignition device, such as a spark plug or the like, and this space can receive a control unit or a control device diagrammatically outlined in these patents. These control units or control devices of standard construction have a tightly closed casing. The inputs and outputs of the control unit or control device are made through the casing and are accessible to produce the necessary electric connections with the aid of plug-in contacts and electric lines, which are then connected to the respective operational parts to be controlled, such as a combustion air fan, ignition device, flame monitor, or the like. For this purpose, in most cases, individual lines mounted in insulating tubing are necessary, and during connection, mix-ups can occur among the individual lines to be connected. Furthermore, this manner of connection is also expensive and time consuming, so that assembly of electric devices, as a whole, is more complicated. Such electric connections, made with the aid of plug-in parts and lines, have a tendency to result in so-called loose contacts, in which a poor electric connection is present, so that disruptions in the control of the heater by the control device can occur.

An approach to solving the problems associated with formation of the necessary electrical connections, so that the assembly process will not be so time consuming and subject to incorrect terminal connections, is presented in copending, commonly assigned, U.S. patent application Ser. No. 276,667, filed Nov. 28, 1988. In this application, arrangements for providing an electrical connection device for components of heaters are disclosed whereby block-shaped plug parts are molded on the lines coming from the respective components, and the block-shaped plug parts are grouped into a unit upon which a cap having complementary plug parts is placed so as to hold the group of plug parts together as a unit upon the outer surface of the heater casing. While such devices as disclosed in this copending application are effective and beneficial, they provide no means for accommodating the mounting of circuit boards, sensors, a control unit, or the like.

SUMMARY OF THE INVENTION

In view of the foregoing, a primary object of the invention is to provide a heater, in particular a vehicle auxiliary heater, of the initially mentioned type in which the difficulties described above are overcome, and in particular, which enables assembly of the control device and the electric connection device connected thereto to be simplified, so that disruptive influences due to poor electric connections are also prevented.

According to a preferred embodiment of the invention, a heater, in particular a vehicle auxiliary heater, of the type which operates with a heat exchange medium that flows through a space between a heat exchanger and a jacket-like outer casing, and which has a control device with inputs and outputs for the essential operations parts, such as a combustion air fan, ignition device, flame monitor, circulating device for the heat exchange medium, solenoid valve in the fuel feed device, and the like, is provided with a mounting space for the control device that is formed directly on the jacket-like outer casing for mounting circuit boards and sensor elements of the control device.

Therefore, in this heater according to the invention, a control device that is mounted in a separate casing of its own need not be provided. Instead, the boards that contain the circuits of the control device and the sensor elements are mounted directly in the mounting space formed by the jacket-like outer casing, so that the control device is integrated into the heater and is physically connected directly to the heater. This simplifies the assembly of such a heater, since line connections from the control device to the heater are eliminated and, in addition, no separate place to mount the control device, such as a control unit, is needed, but rather the heater forms a compact unit together with the control device. Thus, installation costs for installation in a vehicle can also be lowered.

To prevent operational disruptions of the control device that can be caused by heat produced by semiconductor power components of the control device, the semiconductor power components of the control device are preferably in direct heat exchange contact with a wall of the mounting space so that the wall of the mounting space is used as a heat sink to remove the heat lost by these semiconductor power components. In this way, the inner space in which the boards of the control device, etc., are mounted, will not heat up during operation of the control device, but rather these electronic semiconductor power components are actually cooled. Suitably, the semiconductor power components are mounted on side walls of the mounting space that stand up from the outer surface of the jacket-like outer casing, so that an unimpeded removal of the heat loss of the semiconductor power components is possible.

According to another advantageous embodiment of the invention, the sensor elements of the control device, such as a temperature sensor for the heat exchange medium, a temperature safety device or the like, are mounted in the bottom of the mounting space formed by the jacket-like outer casing. In this way, by the special arrangement of the sensor elements, the structural construction outlay for their arrangement is simplified and, in addition, relatively long line connections to these sensor elements can be eliminated. Thus, a compact design of the heater with control device and sensors is achieved. Also, the operational reliability is improved by this, since the causes of malfunctions that can occur inevitably in connection with the line connections and/or plug-in connections are avoided.

To be able to perform a check of the control device in the mounting space, if need be, without having to take apart all its parts, for easy access, the topside of the mounting space is preferably tightly closed by a removable cover. For repair and/or service, the cover can then be removed and the parts of the control device can be checked with respect to their operational capacity. By tightly closing the cover, surrounding influences are prevented from having disadvantageous effects on the operational capacity of the control device.

According to an advantageous feature according to the invention, the mounting space for the control device is integrally cast with the jacket-like outer casing, so that it is made as one piece with it. In this way, no extra steps need to be taken into consideration for providing the mounting space since it is taken care of, already, during production of the jacket-like outer casing.

Suitably the inputs and outputs of the control device are combined on one side of the mounting space, so that the electric connections to be connected to the control device can be configured in a simplified way. In this way, installation mistakes during installation of the boards of the control device can also be avoided.

According to another essential aspect according to the invention, a heater of this generic type is distinguished in that an electric connection device is provided that connects the inputs and outputs of the control device to the respective operational parts to be controlled and/or to the vehicle. With this design of the heater, the line connections are combined with the aid of the electric connection device to reduce the number of individual connection lines and the difficulties appearing with them. The assembly expense is also reduced and connection mistakes, in particular because of mix-ups, can effectively be prevented.

Preferably, the connection device has a plug-like base that contains suitable electric conductor parts and contact parts. These electric conductor parts and contact parts, preferably, produce a direct connection of inputs and outputs of the control device to the operational parts to be controlled, so that plug-in connections susceptible to malfunctions can be avoided. Further, the contact closing of the heater with the vehicle and the contact closing with the respective essential operational parts of the heater and with the control device can be produced in one step using line connection paths that are as short as possible and considerably less sensitive to disruptions.

Preferably, the electric conductor parts and contact parts are made of metal parts and are inserted in the plug-like base of the electric connection device, which, preferably, consists of plastic.

If need be, to have easy and quick access to the electric conductor parts and contact parts, especially for checking, the electric connection device is made in two parts, and a tightly sealing removable cover is fastened on the plug-like base. In this way, the electric contacts in the electric connection device are easily accessible, for example for measuring purposes, without having to take the electric connections apart. Further, the electric connection elements in the electric connection device according to the invention are mounted so as to be effectively protected from mechanical effects and negative influences from surrounding conditions. In this way, the operational reliability of such a heater can be increased considerably.

According to another advantageous aspect of the preferred embodiment of the invention, the electric connection device is mounted, viewed in the axial direction of the heater, next to the mounting space for the control device and, preferably, the electric connection device is immediately adjacent to this mounting space. With such an embodiment, a direct contact closing of the inputs and outputs of the control device can be produced by the electric conductor parts and contact parts without using individual line connections. The connection of the electric connection device leading to the vehicle comes from the electric connection device at a central point. The electric connection device according to the invention can also form a direct plug-in connection with operational parts, such as the ignition device and/or the flame monitor. Thus, in this case also, line connections susceptible to disruptions can be avoided. Simultaneously, in this way the cover-like base of the electric connection device is fixed on a predetermined point on the jacket-like outer casing.

According to another suitable feature according to the invention, the electric connection device simultaneously seals an access opening leading to the combustion chamber of the heater. Thus, at the same time as the electric connection is made with the aid of the electric connection device, an access opening to the combustion chamber needed for assembly and maintenance purposes is also sealed.

Further, according to the invention, the electric connection device can be designed so that fuses, optionally a back-up fuse and/or electric components such as a relay to control external devices, such as a vehicle fan or the like, can be mounted. Thus, previously necessary additional devices to control external devices can be eliminated, and they are combined in the electric connection device in a clear way.

These and further objects, features and advantages of the present invention will become more obvious from the following description when taken in connection with the accompanying drawings which show, for purposes of illustration only, a single embodiment in accordance with the present invention.

DETAILED DESCRIPTION OF THE PREFERRED EMBODIMENT

In the Figures of the drawings, the same or similar parts are provided with the same reference symbols.

Figure 1:
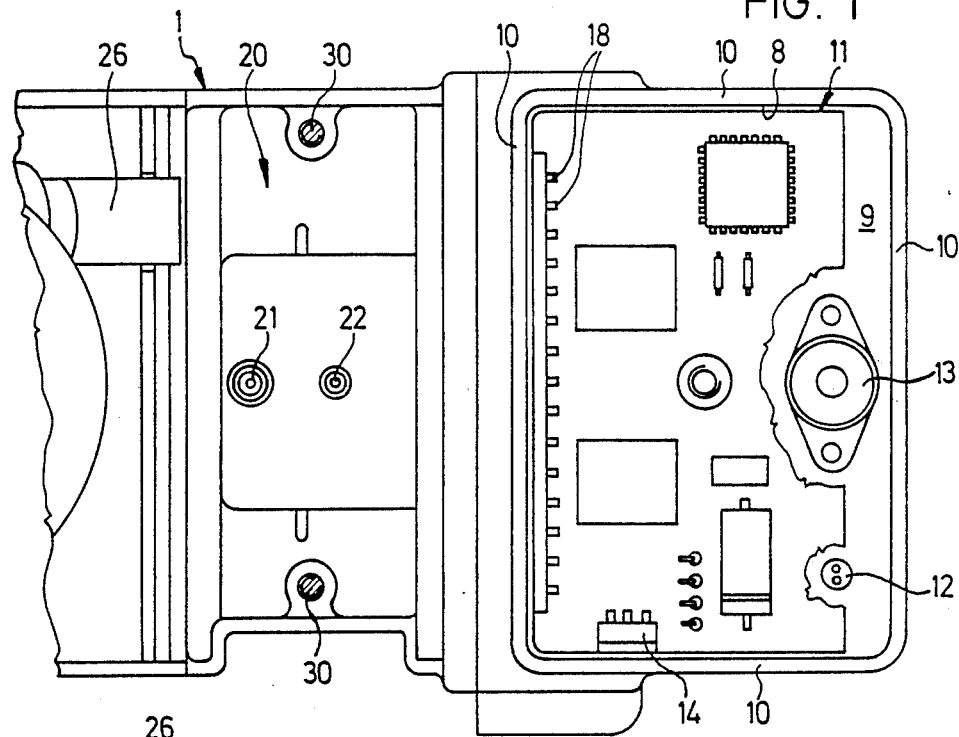
FIG. 1 is a cutaway top view of a heater according to a preferred embodiment of the invention.
Figure 2:
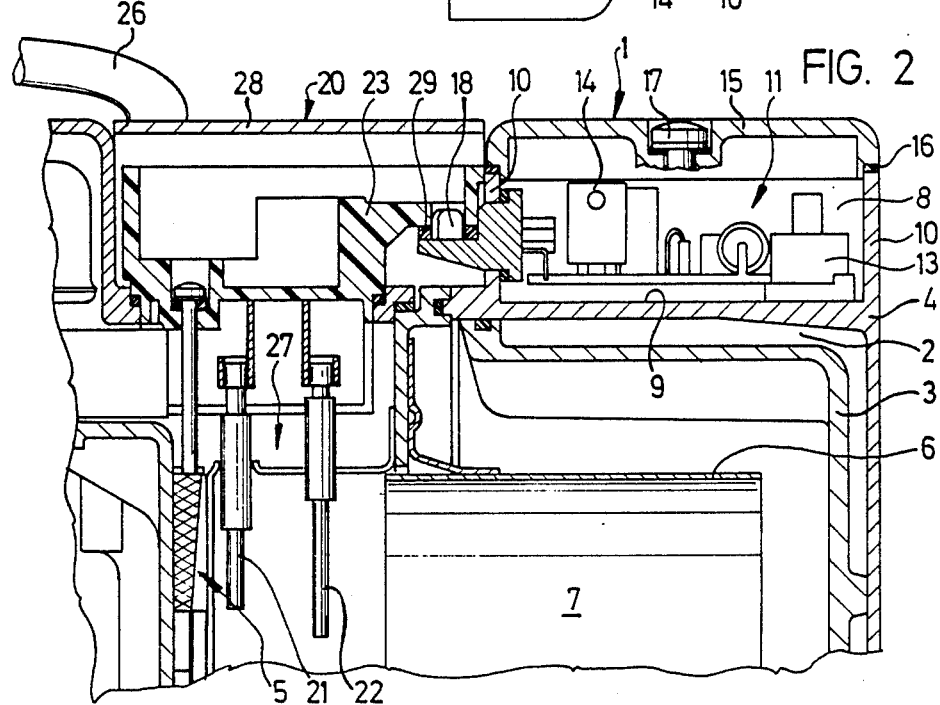
FIG. 2 is a partial sectional side view of the heater corresponding to FIG. 1.
Figure 3:
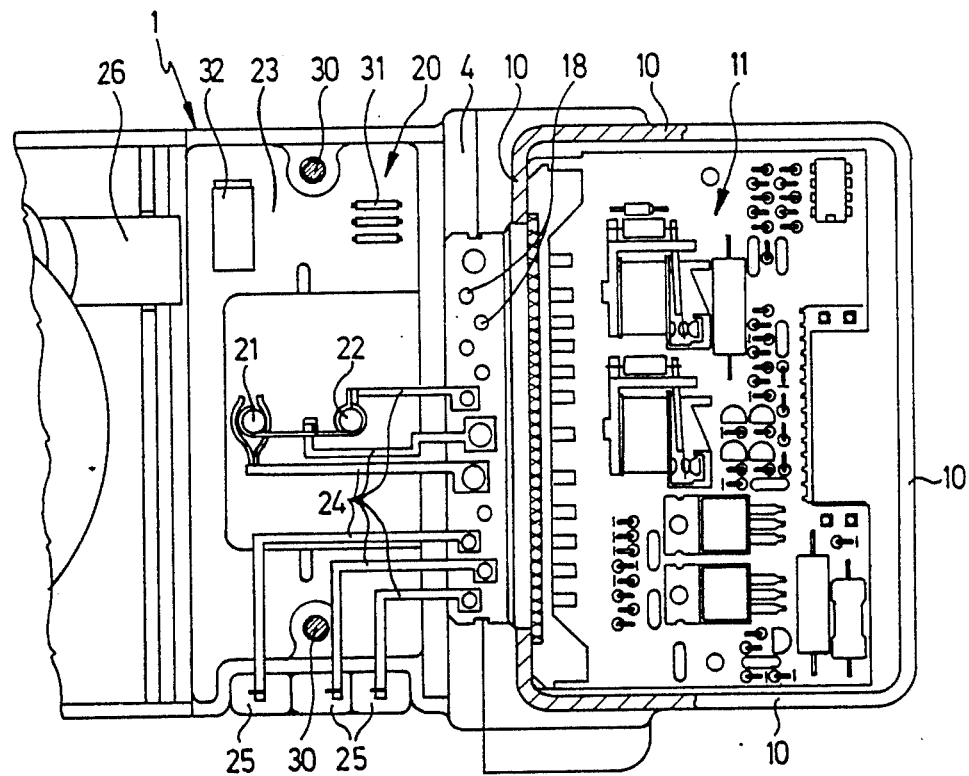
FIG. 3 is a diagrammatic, partial sectional top view illustrating details of the electric connection device and of the control device of the FIG. 1 heater.

In FIGS. 1 to 3, the heater is designated overall by numberal 1. As an example, a vehicle auxiliary heater is shown that operates with a liquid exchange medium. Such a heater is, for example, tied into the coolant circuit of a motor vehicle. The liquid heat exchange medium flows through a space 2 that is formed between a heat exchanger 3 and a jacket-like outer casing 4. Heater 1 also has a diagrammatically represented burner 5, that projects into a combustion chamber 7 formed by a combustion tube 6. The intakes and outputs for the liquid exchange medium are not shown.

As can be seen, especially from FIG. 2, on the outside of the jacket-like outer casing 4 there is formed a mounting space 8, which is, advantageously, integrally cast as one part with jacket-like outer casing 4. The mounting space 8 is bounded by a bottom wall 9 and side walls 10, that run essentially perpendicular to bottom wall 9. A control device, designated overall by numeral 11 is mounted in mounting space 8. Control device 11 includes one or more boards which can be made as printed circuit cards and/or which can be equipped with suitable electrical or electronic components, as can be seen, especially from FIGS. 1 and 3. Further, the control device 11 includes a sensor system comprised of several sensor elements 12, 13 that are illustrated in FIGS. 1 and 2 especially by cutting out one of the boards of control device 11. Here, for example, a temperature sensor 12 for the heat exchange medium flowing in space 2 and a temperature safety device 13 are involved.

The sensor elements 12, 13 are mounted on bottom wall 9 of mounting space 8. In FIGS. 1 and 2, as an example, a semiconductor power component 14 is represented that generates heat (i.e., experiences heat loss) during operation. Of course, control device 11 can also include still other semiconductor power components. This semiconductor power component 14 is mounted on a side wall 10 of mounting space 8 and is in direct heat-conducting contact with this side wall 10 (FIG. 1). In this way, the heat loss of semiconductor power component 14 can be effectively removed and transferred to the surroundings to prevent a heating up of mounting space 8 during operation of heater 1 and control device 11.

The mounting space 8, bounded by side walls 10 and bottom wall 9, is closed on top by a cover 15 which, with the interposition of a seal 16, is supported on side walls 10 of mounting space 8 and, for example, is solidly connected to bottom wall 9 of mounting space 8 by at least one screw 17. Thus, control device 11 is mounted in a manner that is effectively protected from surrounding influences and, also, from externally acting mechanical stresses. By loosening screw 17, cover 15 can be removed so that there is direct access to control device 11, if need be, for example to eliminate malfunctions.

As can also be seen from FIGS. 1 and 2, inputs and outputs 18 of control device 11 are suitably formed on one side of one of the side walls 10 of mounting space 8, so that the necessary electric connections can be combined, concentrated, on one side of mounting space 8.

In connection with FIGS. 2 and 3 of the drawing, further details of an electric connection device designated overall by 20 are explained. This electric connection device 20 connects inputs and outputs 18 of control device 11 to the respective operational parts to be controlled, such as an ignition device 21, a flame monitor device 22, a combustion air fan (not shown), a solenoid valve for the fuel supply device of heater 1 (also not shown), and a circulating pump for the liquid heat exchange medium of heater 1 (not shown), etc.. Simultaneously, electric connection device 20 provides a connection to external devices to be controlled and to the vehicle, when heater 1 is installed in a vehicle.

The electric connection device 20 has a plug-like base 23, which is suitably produced of plastic and which, for example, produces a direct plug-in contact with ignition device 21 and flame monitor device 22. To produce the line connection between the inputs and outputs 18 of the control device 11, electric conductor parts and contact parts 24, preferably made of metal, are inserted into the plug-like base 23. As can be seen especially from FIG. 3, these electric conductor parts and contact parts 24 directly contact inputs and outputs 18 of the control device and produce the necessary electric connections to the essential operational parts to be controlled. It can be further seen from FIG. 3 that electric conductor parts and contact parts 24, starting from the inputs and outputs 18 of control device 11, lead directly to connection parts 25, which are suitably made as plug-in connections and to which, advantageously, complementary connection parts of a combustion air fan, a solenoid valve, a circulating pump or the like can be attached.

As can be seen diagrammatically from FIG. 2, a cable 26 runs from the electric connection device 20. The cable 26 produces an electrical connection with the vehicle and/or external devices, such as a vehicle fan or the like. The individual electric lines needed for this purpose are combined into cable 26.

In the embodiment of electric connection device 20 explained above, the object of simplifying the electrical connections of control device 11 to the respective operational parts to be controlled, i.e., to achieve such connections in such a way so that as few as possible individual lines are susceptible to disruptions. The connections are made in the electric connection device 20, mainly, with the aid of electric conductor parts and contact parts 24.

Viewed in the axial direction of heater 1, electric connection device 20 is next to mounting space 8 for control device 11 and, preferably, it is immediately adjacent to this mounting space 8. In this way, the line connection paths are as short as possible and a space-saving and compact arrangement of the control device 11 and electric connection device 20 is achieved on heater 1.

Plug-like base 23 seals, in the installed state, an access opening 27 (FIG. 2) which is open toward combustion chamber 7 and which is used in case of servicing and during assembly. That is, parts of burner 11 and other devices can be installed or removed through access opening 27 during assembly and for servicing. Thus, plug-like base 23 of electric connection device 20 is able to serve an additional function as a closure for access opening 27.

Toward the top, plug-like base 23, in which electric conductor parts and contact parts 24 are inserted, is closed with the aid of a cover 28, and between plug-like base 23 and cover 28 there is mounted a seal 29 to guarantee a tight sealing relative to the surroundings. In this way, also, the parts of electric connection device 20 are effectively protected from mechanical damage. Cover 28 is suitably fastened, with the aid of two screws 30, to the jacket-like outer casing 4. When cover 28 is removed after loosening screws 30, electric conductor parts and contact parts 24 in plug-like base 23 are accessible so that checks and/or replacements for maintenance purposes can be performed.

Optionally, plug-like base 23 can merely hold (i.e., store) fuses 31 and back-up fuses and/or components, such as, for example, a relay 32 that is used to control an external device, such as a vehicle fan (not shown). However, these external components can, instead, be connected electrically in electric connection device 20, thereby avoiding the use of individual lines, as previously customary, for these components.

Of course, the parts of electric connection device 20 or of control device 11 can also be provided separately from one another in a heater 1. This means that electric connection device 20 can also be designed in the way represented if control device 11 is designed, made, or mounted in a way other than that of the example represented, and vice versa. However, a heater configuration that is especially favorable, from the standpoint of compactness, is obtained if the control device 11 and electric connection device 20 are made to interact, in a combined way, according to the illustrated embodiment.

While we have shown and described a single embodiment in accordance with the present invention, it is understood that the same is not limited thereto, but is susceptible of numerous changes and modifications as known to those skilled in the art, and we, therefore, do not wish to be limited to the details shown and described herein, but intend to cover all such changes and modifications as are encompassed by the scope of the appended claims.

We claim:

1. A vehicle auxiliary heater, of the type which operates with a liquid heat exchange medium that flows through a space between a heat exchanger and a jacket-like outer casing and having a control device with inputs and outputs for controlling essential operating parts, said parts comprising at least one of a combustion air fan, ignition device, flame monitor, circulating device for the heat exchanger medium, and a solenoid valve of a fuel feed device, wherein a mounting space is formed directly on the jacket-like outer casing by an integrally cast formation of said outer casing in which printed circuit boards and sensor elements of said control device are mounted, said sensor elements comprising a temperature sensor for the heat exchange medium and a temperature safety device that are mounted on a bottom wall of the mounting space formed by the jacket-like outer casing.

2. Heater according to claim 1, wherein at least one semiconductor power component of the control device is mounted in direct heat contact with a wall of the mounting space to remove heat produced thereby.

3. Heater according to claim 2, wherein said at least one semiconductor power component is mounted on a side wall forming a boundary of the mounting space.

4. Heater according to claim 1, wherein a top side of the mounting space is closed tightly by a removable cover.

5. Heater according to claim 1, wherein the control device has inputs and outputs that are mounted on one side of the mounting space.

6. Heater according to claim 5, wherein an electric connection device is provided that connects the inputs and outputs of the control device to said operating parts controlled thereby.

7. Heater according to claim 5, wherein an electric connection device is provided that connects the inputs and outputs of the control device.

8. Heater according to claim 6, wherein said electric connection device also connects inputs and outputs of the control device.

9. Heater according to claim 6, wherein said electric connection device has a plug-like base that contains electric conductor parts and contact parts.

10. Heater according to claim 9, wherein the electric conductor parts and contact parts produce a direct connection of the inputs and outputs of the control device to the operating parts to be controlled.

11. Heater according to claim 10, wherein electric conductor parts and contact parts are metal parts.

12. Heater according to claim 10, wherein said inputs and outputs extend externally of the formation forming said mounting space and are oriented for enabling simultaneous interconnection of the electric connection device with the control device and the operating parts to be controlled by the control device which are located externally of said mounting space.

13. Heater according to claim 9, wherein the plug-like base is formed of plastic.

14. Heater according to claim 9, wherein a cover is removably fastened in a tightly sealing manner to said plug-like base.

15. Heater according to claim 9, wherein the electric conductor parts and contact parts are inserted in said plug-like base.

16. Heater according to claim 9, wherein the electric connection device is mounted next to the mounting space for the control device in an axial direction of the heater.

17. Heater according to claim 16, wherein said electric connection device is directly adjacent to said mounting space.

18. Heater according to claim 6, wherein the electric connection device produces a direct plug-in contact with said operating parts of the heater.

19. Heater according to claim 6, wherein the electric connection device also forms a closure for an access opening leading to a combustion chamber of the heater.

20. Heater according to claim 6, wherein the electric connection device contains fuses.

21. Heater according to claim 20, wherein said electric connection device provides storage for spare parts.

22. Heater according to claim 20, wherein said electric connection device contains parts.

23. Heater according to claim 21, wherein a cover is provided for said electrical connection device which fastens to said outer casing and seals a space in which said spare parts are stored in a base of the electric connection device.

24. Heater according to claim 1, wherein said mounting space is confined to an area of said jacket-like casing in the area of the space through which the heat exchange medium flows, and wherein an electric connection device is provided which supplies power to the heater and interconnects inputs and outputs of the control device to said operating parts controlled thereby, said electric connection device directly plugging onto the ignition device and sealing an access opening to a combustion chamber of the heater which is disposed above the ignition device.

* * * * *